June 6, 1933. F. H. BATT 1,913,260
ELECTRIC METER
Filed Dec. 3, 1931
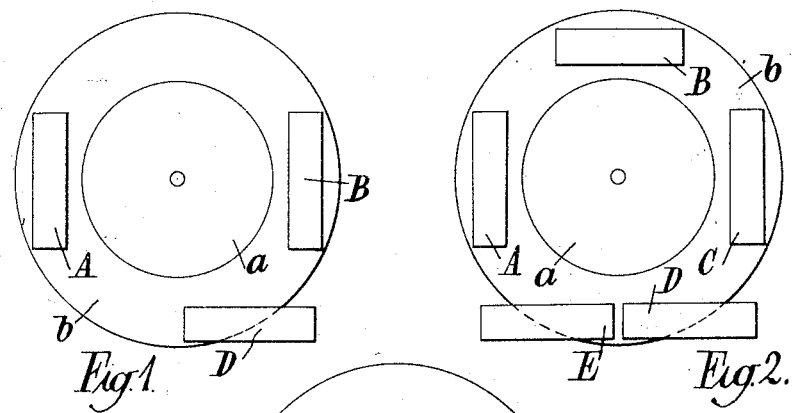
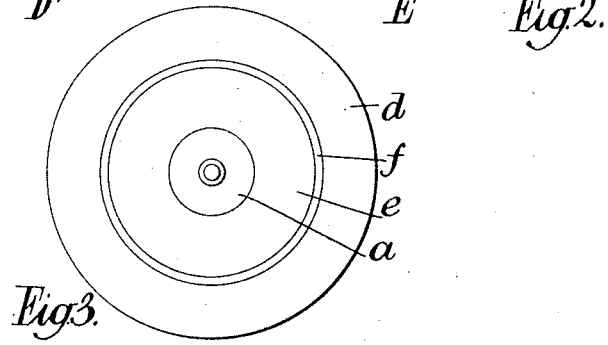
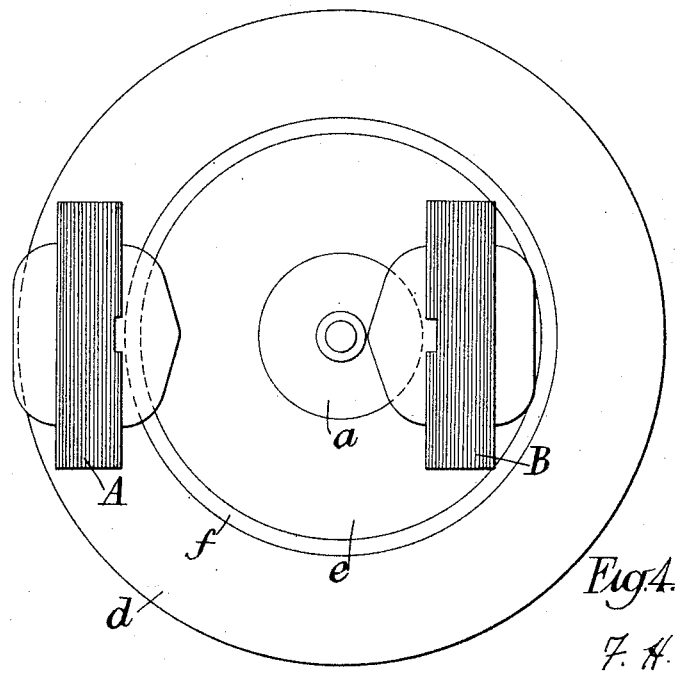
F. H. Batt
INVENTOR
By: Marks & Clerk
ATTYS.

Patented June 6, 1933

1,913,260

UNITED STATES PATENT OFFICE

FREDERICK HORACE BATT, OF HOLLINWOOD, ENGLAND, ASSIGNOR TO FERRANTI INC., OF NEW YORK, N. Y.

ELECTRIC METER

Application filed December 3, 1931, Serial No. 578,793, and in Great Britain January 9, 1931.

This invention relates to electrical apparatus wherein a plurality of motor or torque producing elements are in use for instance for indication or integration purposes.

The invention is more particularly though not exclusively applicable to alternating current electricity meters for polyphase circuits in which connection it will be described hereinafter by way of example.

Heretofore, with such systems wherein a plurality of motor elements are used, each element having to care for a particular registration or indication and a total being required to be integrated or indicated on one register, it has been common, in the case of a polyphase meter, to so dispose the elements that their torques are applied to one common armature or rotor disc.

This method has the disadvantage that although each individual meter element may be providing a true and accurate torque contribution and therefore yielding a true and accurate registration of itself, the use of the common rotor disc for two or more meter elements introduces inaccuracy for reasons now to be described.

The driving torque of a single phase induction motor meter or like movement is obtained by the interaction of shunt and series eddy currents magnetic fields, the eddy currents being generated in the rotor disc. Consequently a rotor disc of material of fairly good conductivity is essential.

Suppose, for example, we have two elements A and B operating on a common disc, then the eddy currents produced by A will circulate beyond the region of usefulness of A and will extend into the neighbourhood of B. The torque and therefore the accurate registration of B is interfered with. Vice versa the eddy currents produced by B also interact similarly with the eddy currents generated by A.

It has been proposed to provide a rotor disc driven by two or more driving systems with holes or cut-out portions for the purpose of wholly or partially eliminating the disturbing effect of the lines of force of different phases. Such a construction of rotor, however, does not eliminate interaction between the eddy currents produced in the region of one driving unit with the eddy currents produced in the region of the other unit or units.

The object of the present invention is to provide constructions wherein such interaction is reduced to a minimum.

According to the present invention I provide one or more simple annuli, that is to say annuli unprovided with any conducting centre portion, such as conducting spokes, thereby preventing the passage of currents from one side to the other of the annulus except by way of the annuli themselves. The annuli are supported on suitable solid insulating material which may comprise a solid central disc or annulus of non-conducting solid material or at least of material possessing a high specific electrical resistance.

Referring to the accompanying diagrammatic drawing:—

Figure 1 is a plan view of one convenient arrangement in accordance with the present invention.

Figure 2 is a similar view of a modification.

Figure 3 is a plan view of a modified form of rotor, and

Figure 4 is a plan view illustrating one mode of use of the rotor of Figure 3.

According to one example illustrated in Figure 1, wherein two motor elements A and B and a braking magnet D operate on a common rotor disc in positions diametrically opposite, I employ a disc with a central portion $a$ formed of insulating material secured to a surrounding annulus $b$ of conducting material. The annulus $b$ is of such width as to overhang on each side of the poles of the motor elements to an adequate extent to provide a suitable path to the eddy currents necessary for the driving torques.

According to a further example illustrated in Figure 2, three motor elements A, B, C and braking magnets D, E act upon a common rotor formed in two parts as before.

According to a modification (not shown) the inner portion of a complete disc of conducting material is removed and insulating supporting arms or spokes are provided.

It will be appreciated that rotors constructed as described above may be of lighter weight than those hitherto employed owing to the inclusion therein of air or other insulating material. Furthermore it will be realized that the present invention is not restricted to the prevention of interaction between sets of driving element eddy currents since it may also be applied to the prevention of interaction between the driving element eddy currents and braking magnet eddy currents.

Instead of employing a solid rotor centre of insulating material I may employ metal having comparatively high electrical resistance.

According to a further modification (Figure 3) a rotor is formed of two annular conducting rings $d$, $e$ separated from each other by a ring of insulation $f$, the inner ring being attached to a central disc $a$ of insulating material or metal of high electrical resistance.

With this arrangement there is positive separation between eddy currents produced in the outer ring $d$ from those produced in the ring $e$. With this example, when applied say, to an induction meter having only one driving unit and one braking magnet, the said unit and braking magnet would be disposed so as to operate respectively on one and the other of the two rings $d$ and $e$. Likewise when applied in cases where two driving units are employed each is so disposed as to influence one only of said rings, e. g. as illustrated in Figure 4, A and B representing the two driving units and $d$ and $e$ the corresponding rings.

Having now described my invention, what I claim as new and desire to secure by Letters Patent is:—

1. In an induction electrical apparatus, a rotor comprising at least one simple conducting annulus supported by insulating means on a spindle and acted upon by at least two driving units.

2. In an induction electrical apparatus as claimed in claim 1, a rotor comprising two electrical separate concentric portions each associated with one only of two driving units.

3. In an induction electrical apparatus as claimed in claim 1, a rotor comprising an electrically conducting annulus upon which said driving units act supported upon an inner section of electrically insulating solid material.

In testimony whereof I have signed my name to this specification.

FREDERICK HORACE BATT.